March 17, 1964   C. H. VAN DOMELEN   3,125,321
SOLENOID ACTIVATED FLOW VALVE
Filed Feb. 6, 1961
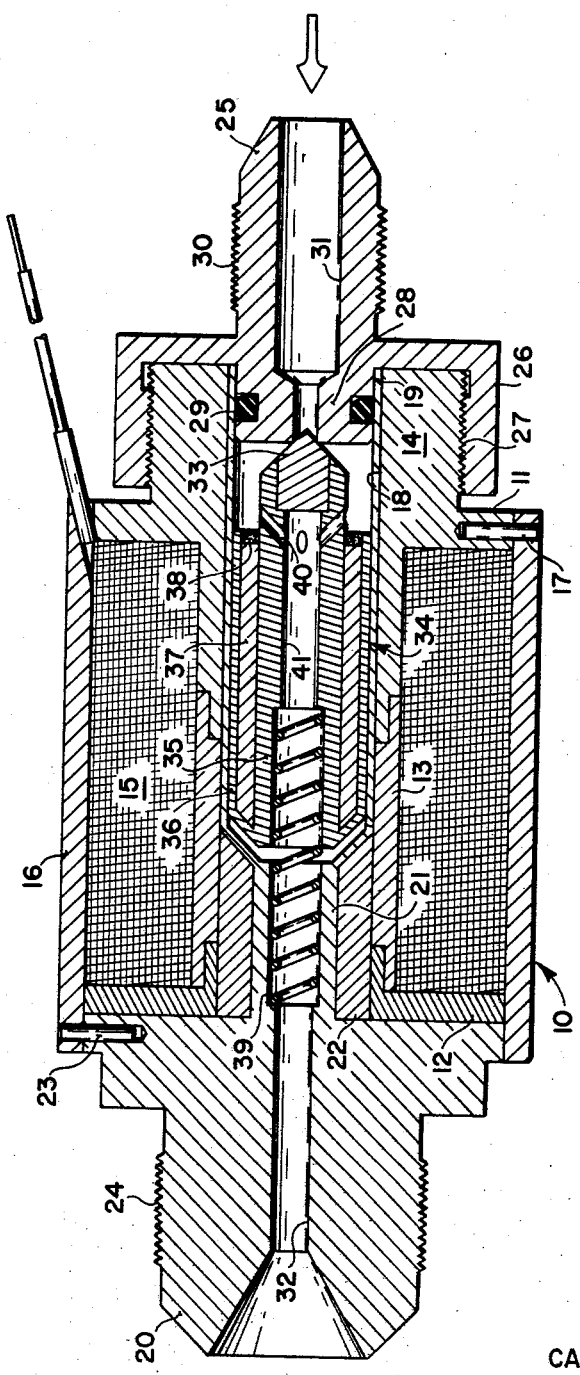
INVENTOR.
CARL H. VAN DOMELEN
BY David Young
ATTORNEY United States Patent Office 3,125,321
Patented Mar. 17, 1964

3,125,321
SOLENOID ACTIVATED FLOW VALVE
Carl H. Van Domelen, Kalamazoo, Mich., assignor to Pneumo Dynamics Corporation, Cleveland, Ohio, a corporation of Delaware
Filed Feb. 6, 1961, Ser. No. 87,289
1 Claim. (Cl. 251—139)

The instant invention relates to valves, and more particularly to valves in which the parts thereof are protected from reaction with the fluid flowing through the valve, and likewise the fluid is protected from contamination by reaction with the valve parts.

It is an object of the instant invention to provide an improved valve for controlling the flow of fluids in which the valve parts contacted by the fluid are protected from reaction with the fluid.

It is a further object of the instant invention to provide an improved valve for controlling the flow of fluids, in which the parts of the valve contacted by the fluid are formed of a material that is non-reactive with the fluid to prevent contamination of the fluid.

It is another object of the instant invention to provide an improved valve for fluids, in which there is a sheath for lining the bore of the valve into which the fluid flows, said sheath being formed of material that is non-reactive with the fluid and being integral with an end fitting of the valve to prevent reaction of the valve parts with the fluid.

It is also an object of the instant invention to provide an improved valve for fluids, in which there is a solenoid for operation of a valve body, which is formed of material that is non-reactive with the fluid, therein being a magnetic insert encased within the valve body for interaction with the solenoid to operate the valve body, whereby the magnetic insert is protected from reaction with the fluid.

It is still another object of the instant invention to provide a valve structure including elements thereof disposed in the flow path of fluid through the valve, which elements are formed of material that is non-reactive with the fluid to protect the valve from reaction with the fluid, and likewise to prevent contamination of the fluid by reaction with valve.

Other objects and advantages of the instant invention will appear from the description thereof which follows.

The drawing is a longitudinal sectional view of a valve constructed in accordance with the instant invention.

Referring to the drawing, the valve 10 of the instant invention includes a main body 11 that comprises a coil retainer 12, a sleeve 13 and a combined coil retainer and fitting 14. The coil retainer 12, the sleeve 13 and the combined coil retainer and fitting 14 are assembled together in a unit, as shown in the drawing, and the elements secured to each other in a suitable manner, as by brazing, to form the main body 11 with an annular configuration for winding the solenoid coil 15 on the main body 11 within the confines of the coil retainer 12 and the combined coil retainer and fitting 14. A cylindrical solenoid housing 16 fits over the coil retainer 12 and the combined coil retainer and fitting 14, and provides a cover for the solenoid coil 15. The solenoid housing 16 is secured to the main body 11 by one or more radially disposed pins 17 which extend through the solenoid housing 16 and are press fitted into the combined coil retainer and fitting 14.

A bore 18 is centrally disposed in the main body 11 and extends therethrough in an axial direction. The main body 11 may be formed of any material that is considered to be suitable for the purpose, without regard to whether this material is reactive with the fluid with which the valve 10 is to be used. In order to protect the main body 11 from reaction with the fluid, there is provided a sheath 19, which is formed of material that is non-reactive with the fluid. The sheath 19 is relatively thin and closely fits the bore 18 to form a liner in the bore 18. The sheath 19 extends the full length of the bore 18, and is integrally formed with an outlet end fitting 20, which is also formed of material that is non-reactive with the fluid.

The outlet end fitting 20 has a neck 21 in which there is placed a spacer element 22, which may be formed of any material, without regard to whether it is reactive with the fluid, since it is protected by the neck 21 of the outlet end fitting 20. With the spacer element 22 assembled on the neck 21 of the outlet end fitting 20, the sheath 19 and the spacer element 22 provide a cylindrical outer surface, permitting ready insertion thereof into the bore 18 in an axial direction. The solenoid housing 16 extends in an axial direction beyond the coil retainer 12 to overlap the outlet end fitting 20, and the latter is secured to the main body 11 by one or more pins 23 extending radially through the solenoid housing 16 and press fitted into the outlet end fitting 20. The outlet end fitting 20 includes threads 24, formed on the periphery thereof, for securing a line to the outlet end fitting 20.

At the opposite end of the valve 10 there is provided an outlet end fitting 25 having an annular flange 26 which is internally threaded to be engaged with threads 27 formed on the combined coil retainer and fitting 14 to thereby secure the inlet end fitting 25 to the main body 11. The inlet end fitting 25 includes an integral projectant portion 28 which extends into the bore 18 within the sheath 19, with the projectant portion 28 closely fitting the bore 18 within the sheath 19. The projectant portion 28 carries an O-ring 29, which forms a seal between the projectant portion 28 and the sheath 19. The inlet end fitting 25 and the O-ring 29 are each formed of material that is non-reactive with the fluid. Threads 30 are formed on the inlet end fitting 25 for the purpose of securing a line to the inlet end fitting 25.

The fluid flows into the valve 10 through an inlet flow passage 31 formed in the inlet end fitting 25, and the fluid flows out of the valve 10 through an outlet flow passage 32 that is formed in the outlet end fitting 20. A valve element 33, having a conical configuration, is normally seated in the end of the inlet flow passage 31 to stop the flow of fluid through the valve 10, and is adapted to be spaced from the end of the inlet flow passage 31 to permit the flow of fluid through the valve 10. The valve element 33 is formed of material that is non-reactive with the fluid. The valve element 33 is carried in the end of a valve body 34 that is formed of material that is non-reactive with the fluid. The valve body 34 is formed as an integral member with an inner cylindrical wall 35 of substantial thickness and an outer cylindrical wall 36 that is relatively thin. The cylindrical walls 35, 36 are spaced from each other to form a chamber therebetween in which there is placed a cylindrical insert 37, which is formed of magnetic material adapted to be acted upon by the solenoid coil 15 for moving the valve body 34 in the bore 18.

The magnetic insert 37 is sealed in the valve body 34 by a weld 38, which is also non-reactive with the fluid. A compression spring 39 is seated at one end in the neck 21 of the outlet end fitting 20 and is seated at its other end in the cylindrical wall 35 of the valve body 34. The compression spring 39 thus acts to move the valve body 34 to the right, as viewed in the drawing, to seat the valve element 33 in the end of the inlet flow passage 31. Upon energization of the solenoid coil 15, the interaction of the latter with the magnetic insert 37 will move the valve body 34 to the left, as viewed in the drawing, overcoming the force of the compression spring 39, and spacing the valve element 33 from the end of the inlet flow passage 31, thereby permitting fluid to flow into the bore 18 from the inlet flow passage 31.

A plurality of circumferentially spaced ports 40 extend in a radial direction through the cylindrical wall 35 of the valve body 34 and provide communication between the bore 18 and a flow passage 41 formed in the valve body 34 within the cylindrical wall 35. Thus, when the valve element 33 is removed from the end of the inlet flow passage 31, the flow of fluid will be into the bore 18 and through the ports 40 to the flow passage 41, and out through the outlet flow passage 32. The valve 10 is normally closed by operation of the compression spring 39, and upon energization of the solenoid coil 15, the force of the compression spring 39 is overcome to open the valve 10 for flow of the fluid therethrough. The spacer element 22 acts as a backing member for the valve body 34 when it is moved to the left by the solenoid coil 15.

Thus in accordance with the instant invention there is provided a valve structure in which the parts of the valve structure in the flow path of the fluid are formed of material that is non-reactive with the fluid to protect the valve structure from reaction with the fluid and at the same time preventing contamination of the fluid due to such reaction. One application for the valve structure of this invention is for control of the flow of concentrated hydrogen peroxide, which is reactive with most commonly used materials. In this application the non-reactive parts of the structure are formed of an aluminum alloy, which is non-reactive with the concentrated hydrogen peroxide. This aluminum alloy is relatively soft; however, by the valve structure of this invention the main body of the valve may be constructed of material having the desired strength characteristics without regard to reaction with the concentrated hydrogen peroxide, thereby imparting the required strength characteristics to the valve structure as a whole, and also providing rigid support for the relatively soft aluminum parts. The soft aluminum alloy parts may be anodized to improve the wear characteristics thereof where this is indicated, as in the sheath and valve body which are movable relatively to each other. The valve structure of this invention also has application to control of the flow of other reactive fluids such as acids, other reactive chemicals and salt water, and also in food processing wherein it is particularly essential that there be no contamination of the fluid.

Obviously those skilled in the art may make various changes in the details and arrangements of parts without departing from the spirit and scope of the invention as defined by the claims hereto appended, and it is therefore desired that the invention not be restricted to the precise construction herein disclosed.

Having thus described and shown an embodiment of the invention, what it is desired to secure by Letters Patent of the United States is:

A valve structure for controlling flow of fluid comprising a main body member, fluid inlet means mounted on one end of said body member and providing a valve seat, said main body member having a longitudinally extending bore therethrough, a thin sheath member closely fitted within said bore and forming a liner therefor, said sheath member being non-magentic and non-reactive with said fluid and defining a passageway communicable with said fluid inlet means, an electric coil around said sheath and a portion of said body operable to produce a magnetic field extending through said sheath, a valve assembly closely fitting within said passageway and movable longitudinally relative to said sheath, said valve assembly comprising a thin outer cylindrical shell closely fitting the inner wall of said sheath, an inner, relatively thick cylinder concentric with and spaced from said shell, means formed of non-magnetic and non-reactive material interconnecting said shell and said cylinder thereby to provide an annular chamber therebetween, said inner cylinder defining an inner flow passage for said fluid through said valve assembly, said inner cylinder having radially extending ports formed therein for directing fluid from said passageway defined by said sheath to said inner flow passage defined by said inner cylinder, said outer shell and inner cylinder being formed from non-magnetic material which is non-reactive with said fluid, a ring of magnetic material enclosed within said annular chamber, a valve element mounted at one end of said inner cylinder adjacent to said valve seat for selective seating thereagainst, said valve member being non-reactive with said fluid, spring means engaging said inner cylinder and biasing said valve assembly axially for seating of said valve member on said seat, said coil when energized producing an axial force on said ring opposing the force of said spring to move said valve member away from said valve seat.

References Cited in the file of this patent

UNITED STATES PATENTS

| | | |
|---|---|---|
| 2,279,243 | Parsons | Apr. 7, 1942 |
| 2,619,116 | Ralston | Nov. 25, 1952 |
| 2,634,757 | Houghton | Apr. 14, 1953 |
| 2,695,685 | Jamison | Nov. 30, 1954 |
| 2,736,465 | Bauerlein | Feb. 28, 1956 |
| 2,764,333 | Schnehain | Sept. 25, 1956 |